United States Patent [19]

Jeuniaux

[11] Patent Number: 5,686,404
[45] Date of Patent: Nov. 11, 1997

[54] SUDS CONTROLLING COMPOSITIONS

[75] Inventor: Etienne Maria B. A. Jeuniaux, Merchtem, Belgium

[73] Assignee: The Procter & Gamble Company, Cincinnati, Ohio

[21] Appl. No.: 295,770

[22] PCT Filed: Mar. 1, 1993

[86] PCT No.: PCT/US93/01792

§ 371 Date: Feb. 14, 1995

§ 102(e) Date: Feb. 14, 1995

[87] PCT Pub. No.: WO93/18126

PCT Pub. Date: Sep. 16, 1993

[30] Foreign Application Priority Data

Mar. 6, 1992 [EP] European Pat. Off. ............ 92870036

[51] Int. Cl.$^6$ ................................. C11D 3/34; C11D 3/37
[52] U.S. Cl. ........................ 510/466; 510/477; 252/321; 252/358
[58] Field of Search .................... 252/321, 358; 510/466, 475

[56] References Cited

U.S. PATENT DOCUMENTS

| | | | |
|---|---|---|---|
| 4,111,855 | 9/1978 | Barratt et al. | 252/545 |
| 4,265,779 | 5/1981 | Gandolfo et al. | 252/135 |
| 4,274,977 | 6/1981 | Koerner et al. | 252/358 |
| 4,400,288 | 8/1983 | Dhanani et al. | 252/135 |
| 4,652,392 | 3/1987 | Baginski et al. | 252/109 |
| 4,796,679 | 1/1989 | Castro et al. | 252/174.15 |
| 4,798,679 | 1/1989 | Castro et al. | 252/174.15 |
| 4,978,471 | 12/1990 | Starch | 252/174.15 |
| 4,983,316 | 1/1991 | Starch | 252/174.15 |

FOREIGN PATENT DOCUMENTS

| | | |
|---|---|---|
| 0353388 | 2/1990 | European Pat. Off. . |
| 0564257 | 3/1992 | European Pat. Off. . |
| 1304803 | 1/1973 | United Kingdom . |

Primary Examiner—Douglas J. McGinty
Assistant Examiner—Kery Fries
Attorney, Agent, or Firm—Kim William Zerby; T. David Reed; J. J. Yetter

[57] ABSTRACT

The present invention provides suds controlling compositions, comprising a silicone antifoam agent, a carrier material, a dispersant and a polymer-based latex. The present invention also provides detergent compositions containing said suds controlling compositions.

3 Claims, No Drawings

SUDS CONTROLLING COMPOSITIONS

TECHNICAL FIELD

The present invention relates to suds controlling compositions and stable liquid detergent compositions containing them.

BACKGROUND

It has become common practice in the detergent industry to include in detergent compositions materials which are intended to control the amount of foam produced during a washing cycle in a washing machine.

Silicone antifoam agents in finely dispersed form have been found to be particularly effective species, and efforts have been directed towards increasing the stability of such agents upon prolonged storage in liquid detergent compositions containing them.

However, it has found to be difficult to create and maintain the finely dispersed form of the silicone antifoam agents in liquid detergent compositions, especially in a high ionic strength medium.

In U.S. Pat. No. 4,798,671, it has been proposed to make a premix of dispersing agents and suds controlling agents to obtain storage benefits.

Surprisingly, it has now been found that improved storage stability of suds controlling agents in liquid detergent compositions can be achieved by adding to said agents a polymer-based latex. According to the present invention, a suds controlling composition is provided which has improved stability upon storage when incorporated into liquid detergents.

According to another embodiment of the present invention, a stable liquid detergent composition comprising said suds controlling composition is provided.

According to still another embodiment of the present invention, a process is provided to obtain stable liquid detergent compositions comprising the suds controlling composition of the present invention.

SUMMARY OF THE INVENTION

The present invention provides suds controlling composition for inclusion in a detergent composition in liquid form, comprising a silicone antifoam agent, a carrier material, a dispersant and a polymer-based latex.

The present invention also provides liquid detergent compositions comprising said suds controlling composition, surface-active agents and optionally other detergent ingredients.

DETAILED DESCRIPTION OF THE INVENTION

The Silicone Antifoam Agent

In industrial practice, the term "silicone" has become a generic term which encompasses a variety of relatively high-molecular-weight polymers containing siloxane units and hydrocarbyl groups of various types. Generally, the silicone antifoam agent can be described as siloxanes having the general structure:

wherein n is from 20 to 2.000, and where each R independently can be an alkyl or an aryl radical. Examples of such substituents are methyl, ethyl, propyl, isobutyl, and phenyl. Preferred polydiorganosiloxanes are polydimethylsiloxanes having trimethylsilyl endblocking units and having a viscosity at 25° C. of from $5 \times 10^{-5}$ m$^2$/s to 0.1 m$^2$/s i.e. a value of n in the range 40 to 1500. These are preferred because of their ready availability and their relatively low cost.

A preferred type of silicone antifoam agent useful in the compositions herein comprises a mixture of an alkylated siloxane of the type hereinabove disclosed and solid silica.

The solid silica can be a fumed silica, a precipitated silica or a silica made by the gelformation technique. The silica particles can be rendered hyrophobic by treating them with diaklylsilane groups and/or trialkylsilane groups either bonded directly onto the silica or by means of silicone resin. A preferred antifoam agent comprises a hydrophobic silanated, most preferably trimethylsilanated silica having a particle size in the range from 10 nanometer to 20 nanometer and a specific surface area above 50 m$^2$/g. Silicone antifoam agents employed in the suds controlling composition suitable for to the present invention have an amount of silica in the range of 1 to 30%, more preferably from 1 to 20% by weight of the total weight of the silicone antifoam resulting in silicone antifoams having an average viscosity in the range from $2 \times 10^{-4}$m$^2$/s to 1m$^2$/s. Preferred silicone antifoams may have a viscosity in the range of from $5 \times 10^{-3}$m$^2$/s to 0.1 m$^2$/s. Particularly suitable are silicone antifoams with a viscosity of $2 \times 10^{-2}$m$^2$/s or $4.5 \times 10^{-2}$m$^2$/s.

Examples of suitable silicone antifoam agents which are commercially available are QCF2-3329, QCF2-3421, Q2-3302 manufactured by Dow Corning.

The silicone antifoam agent is present in the suds controlling composition at levels of from 2% to 20% by weight, preferably 5% to 10% by weight of the suds controlling composition.

The Carrier Material

The suds controlling composition of the present invention comprise the silicone anti-foam agent in the form of a dispersion in a water-soluble or water-dispersable organic carrier.

Suitable organic carriers are nonionic surfactants. Preferably, the nonionic surfactants are ethoxylated surfactants. In general, ethoxylated nonionic surfactants suitable herein have an average ethyleneoxy content in the range from 35% to 70% and especially from 50% to 62.5% by weight of the surfactant.

Examples of suitable nonionic surfactants include the condensation products of primary or secondary aliphatic alcohols having from 8 to 24 carbon atoms, in either straight chain or branched chain configuration, with from 2 to 18 moles of alkylene oxide per mole of alcohol. Preferably, the aliphatic alcohol comprises between 9 and 15 carbon atoms and is ethoxylated with between 2 and 9, desirably between 3 and 8 moles of ethylene oxide per mole of aliphatic alcohol. Most preferred are alkoxylated nonionic surfactants having an average HLB in the range from 9.5 to 13.5, especially 10 to 12.5. Highly suitable nonionic surfactants of this type are ethoxylated primary C9–15 alcohols having an average degree of ethoxylation from 2 to 9, more preferably from 3 to 8.

The carrier is present in the suds controlling composition at levels from 30% to 95% by weight, preferably 80% to 90% by weight of the total suds controlling composition.

Dispersant

The suds controlling composition of the present invention comprises a dispersing agent.

The dispersing agent disperses or helps disperse the silicone antifoam agent uniformly so that stable, preferably isotropic, detergent formulas can be prepared. The dispersing agent is premixed with the silicone antifoam agent prior to incorporation into the liquid detergent composition.

Suitable dispersing agents include materials such as ethylene oxide adducts of linear or arylphenols having from 8 to 20 carbon atoms per molecule, such as lauryl polyoxethylene glycol ether, stearyl polyoxyethylene, glycol ether, cetyl polyoxyethylene glycol ether, and nonylphenol polyoxyethylene glycol ether, and also ethylene oxide adducts of linear or branched monocarboxylic acids and having HLBs of greater than about 13.5, preferably greater than about 14. Preferably, such addition products have short hydrophylic chains containing 12 or preferably less carbon atoms and from about 8 to about 15 ethylene oxide units per molecule. Other examples of preferred dispersants are polyoxyethylene glycol sorbitan esters of polyoxyethylene glycol sorbital esters having HLB values of 14 or more, such as polyoxyethylene glycol sorbitan hexaoleate or polyoxyethylene sorbitol hexaoleate. Additional examples of preferred dispersants are fatty acid mono-,di-, and/or polyglycerides and sodium or calcium stearoyl lactate, diglycerol stearate, and sorbitan monostearate. The suds controlling composition of the present invention can contain a single type of dispersant or mixtures of at least two different types of dispersants.

Other useful dispersants are commercial oxyethylated polyhydric alcohols or their derivatives or similar compounds having an active hydrogen atom, as well as fatty acid esters of glycerol or sorbitol.

Anionic emulsifiers, such as sodium dodecylbenzenesulphonate or sodium laurylsulphate, can also be used, but preferably with a solvent.

Preferred is an emulsifier mixture of oxyethylated fatty alcohol and oxyethylated triglyceride having an HLB value preferably in the range from about 14 to 16.

The preferred solvent for dimethylpolysiloxane is tetrameric or pentameric cyclomethicone. Particularly preferred dispersants for use herein are cyclomethicone and C9–C11 linear chain alcohols ethoxylated with from about 7 to about 10 moles of ethylene oxide per mole of alcohol especially when the unreacted alcohol and monoethoxylated alcohol are removed and mixtures thereof.

The most preferred dispersants are mixtures of silicone glycol copolymers and cyclomethicone compounds. Examples of said mixtures which are commercially available are DC3225C manufactured by Dow Corning.

The amount of dispersant is from 1% to 20%, preferably from 1% to 5% by weight of the suds controlling composition.

The Polymer-Based Latex

The silicone antifoam compounds, as described hereinabove, must be present in the liquid detergent compositions in finely dispersed form in order to be effective. However, the particles of the antifoam agent present in the liquid detergent composition tend to coagulate upon storage, thereby becoming less efficient antifoam agents.

According to the present invention, it has been found that improved stability of the silicone antifoam compounds can be achieved by adding small amounts of polymer-based latex to the silicone antifoam compounds. The concept of "stability" as used herein is in the context of maintaining the silicone antifoam agent in finely dispersed form.

The addition of low levels of polymer-based latex reduces the coalescence of the silicone antifoam particles so that stable detergent formulas can be prepared. The polymer-based latex consists of finely divided particles of polymer dispersed in a surfactant matrix. The polymer-based latices are mainly prepared by polymerizing low molecular weight monomers in a free radical emulsion polymerisation system.

Suitable monomers that can be used to make the polymer-based latex are styrene, C1–C4 alkyl acrylate, ethylene, butadiene, vinylchloride, vinylidene chloride or mixtures thereof.

Preferred polymer-based latices for use in the present invention are polystyrene-based latices comprising homo- and copolymers of polystyrene. Examples of such polystyrene-based latex are commercially known as Lytron 631, comprising 40% of polystyrene raw material dispersed in nonionic surfactant solution.

Other suitable polymer-based latex are butadiene-styrene, butadiene-acrylonitrile, butadiene-styrene-acrylonitrile and chloroprene based latices.

The polymer present in the polymer based-latex typically have a particle size from 50 to 300 nanometer, preferably from 50 to 200 nanometer. By "size" herein is meant average particle diameter for substantially spherical particles, or the size of the largest diameter or dimension for nonspherical particles Preferably, the polymer present in the polymer-based latex has a small particle size distribution. Preferred particle sizes distributions can be chosen such that 80% of all the particles have a particle size varying between 80% and 120% of the average particle size Most preferred particle size distributions have 90% of all particles varying between 80% and 120% of the average particle size. The polymer-based latex is present in the suds controlling composition preferable from 1% to 40%, preferably from 1% to 15% by weight of the suds controlling composition. The level of the polymer-based latex, present in the liquid detergent composition is preferable from 0.01% to 0.12%, more preferable from 0.01% to 0.08% by weight of the total detergent composition.

In terms of processing, the compounds of the suds controlling composition are premixed before incorporation into the liquid detergent composition. The suds controlling composition of the present invention is made by mixing the silicone antifoam agent, the carrier material, the dispersant and the polymer-based latex in a high shear mixer. The high shear mix can be prepared using any conventional high shear mixing equipment. The suds controlling composition of the present invention can also be incorporated in detergent additive products. Such additive products are intended to supplement or boost the performance of conventional detergent compositions and may contain any of the components of such compositions.

The liquid detergent compositions comprising the suds controlling composition of the present invention is made by mixing the suds controlling composition together with detergent ingredients. The liquid detergent compositions comprising the suds controlling composition can be provided having various ratios and proportions of the detergent additives.

The amount of suds controlling composition in the liquid detergent composition can be varied, depending upon the suds profile desired by the formulation. The level of the suds controlling composition is preferable present from 0.8% to 3.0% by weight of the total detergent composition.

Detergent Ingredients

In another embodiment of the present invention, a liquid detergent composition is provided comprising the suds controlling composition of the present invention mixed with detergent ingredients. Detergent ingredients include surfactants, builders and optional detergent additives. A wide range of surfactants can be used in the detergent composition of the present invention.

A typical listing of anionic, nonionic, ampholytic and zwitterionic classes, and species of these surfactants, is given in U.S. Pat. No. 3,664,961 issued to Norris on May 23, 1972.

Mixtures of anionic surfactants are particularly suitable herein, especially mixtures of sulphonate and sulphate surfactants in a weight ratio of from 5:1 to 1:2, preferably from 3:1 to 2:3, more preferably from 3:1 to 1:1. Preferred sulphonates include alkyl benzene sulphonates having from 9 to 15, especially 11 to 13 carbon atoms in the alkyl radical, and alpha-sulphonated methyl fatty acid esters in which the fatty acid is derived from a $C_{12}$–$C_{18}$ fatty source preferably from a $C_{16}$–$C_{18}$ fatty source. In each instance the cation is an alkali metal, preferably sodium. Preferred sulphate surfactants are alkyl sulphates having from 12 to 18 carbon atoms in the alkyl radical, optionally in admixture with ethoxy sulphates having from 10 to 20, preferably 10 to 16 carbon atoms in the alkyl radical and an average degree of ethoxylation of 1 to 6. Examples of preferred alkyl sulphates herein are tallow alkyl sulphate, coconut alkyl sulphate, and $C_{14-15}$ alkyl sulphates. The cation in each instance is again an alkali metal cation, preferably sodium.

One class of nonionic surfactants useful in the present invention are condensates of ethylene oxide with a hydrophobic moiety to provide a surfactant having an average hydrophilic-lipophilic balance (HLB) in the range from 8 to 17, preferably from 9.5 to 13.5, more preferably from 10 to 12.5. The hydrophobic (lipophilic) moiety may be aliphatic or aromatic in nature and the length of the polyoxyethylene group which is condensed with any particular hydrophobic group can be readily adjusted to yield a water-soluble compound having the desired degree of balance between hydrophilic and hydrophobic elements.

Especially preferred nonionic surfactants of this type are the $C_9$–$C_{15}$ primary alcohol ethoxylates containing 3–8 moles of ethylene oxide per mole of alcohol, particularly the $C_{14}$–$C_{15}$ primary alcohols containing 6–8 moles of ethylene oxide per mole of alcohol and the $C_{12}$–$C_{14}$ primary alcohols containing 3–5 moles of ethylene oxide per mole of alcohol.

Another class of nonionic surfactants comprises alkyl polyglucoside compounds of general formula

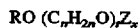

wherein Z is a moiety derived from glucose; R is a saturated hydrophobic alkyl group that contains from 12 to 18 carbon atoms; t is from 0 to 10 and n is 2 or 3; x is from 1.3 to 4, the compounds including less than 10% unreacted fatty alcohol and less than 50% short chain alkyl polyglucosides. Compounds of this type and their use in detergent are disclosed in EP-B 0 070 077, 0 075 996 and 0 094 118.

Also suitable as nonionic surfactants are poly hydroxy fatty acid amide surfactants of the formula

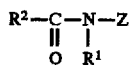

wherein $R^1$ is H, or $R^1$ is $C_{1-4}$ hydrocarbyl, 2-hydroxy ethyl, 2-hydroxy propyl or a mixture thereof. $R^2$ is $C_{5-31}$ hydrocarbyl, and Z is a polyhydroxyhydrocarbyl having a linear hydrocarbyl chain with at least 3 hydroxyls directly connected to the chain, or an alkoxylated derivative thereof. Preferably, $R^1$ is methyl, $R^2$ is a straight $C_{11-15}$ alkyl or alkenyl chain such as coconut alkyl or mixtures thereof, and Z is derived from a reducing sugar such as glucose, fructose, maltose, lactose, in a reductive amination reaction.

The compositions according to the present invention may further comprise a builder system. Any conventional builder system is suitable for use herein including aluminosilicate materials, silicates, polycarboxylates and fatty acids, materials such as ethylenediamine tetraacetate, metal ion sequestrants such as aminopolyphosphonates, particularly ethylenediamine tetramethylene phosphonic acid and diethylene triamine pentamethylenephosphonic acid. Though less preferred for obvious environmental reasons, phosphate builders can also be used herein.

Suitable builders can be an inorganic ion exchange material, commonly an inorganic hydrated aluminosilicate material, more particularly a hydrated synthetic zeolite such as hydrated zeolite A, X, B or HS.

Another suitable inorganic builder material is layered silicate, e.g. SKS-6 (Hoechst). SKS-6 is a crystalline layered silicate consisting of sodium silicate ($Na_2Si_2O_5$).

Suitable polycarboxylates builders for use herein include citric acid, preferably in the form of a water-soluble salt, derivatives of succinic acid of the formula R—CH(COOH)CH2(COOH) wherein R is C10–20 alkyl or alkenyl, preferably C12–16, or wherein R can be substituted with hydroxyl, sulfo sulfoxyl or sulfone substituents. Specific examples include lauryl succinate , myristyl succinate, palmityl succinate2-dodecenylsuccinate, 2-tetradecenyl succinate. Succinate builders are preferably used in the form of their water-soluble salts, including sodium, potassium, ammonium and alkanolammonium salts.

Other suitable polycarboxylates are oxodisuccinates and mixtures of tartrate monosuccinic and tartrate disuccinic acid such as described in U.S. Pat. No. 4,663,071.

Especially suitable fatty acid builders for use herein are saturated or unsaturated $C_{10-18}$ fatty acids, as well as the corresponding soaps. Preferred saturated species have from 12 to 16 carbon atoms in the alkyl chain. The preferred unsaturated fatty acid is oleic acid. Another preferred builder system for liquid compositions is based on dodecenyl succinic acid.

Other suitable water-soluble organic salts are the homo- or copolymeric acids or their salts, in which the polycarboxylic acid comprises at least two carboxyl radicals separated from each other by not more than two carbon atoms.

Polymers of this type are disclosed in GB-A-1,596,756. Examples of such salts are polyacrylates of MW 2000–5000 and their copolymers with maleic anhydride, such copolymers having a molecular weight of from 20,000 to 70,000, especially about 40,000.

Detergency builder salts are normally included in amounts of from 10% to 80% by weight of the composition preferably from 20% to 70% and most usually from 30% to 60% by weight.

Other components used in detergent compositions may be employed, such enzymes and stabilizers or activators therefore, soil-suspending agents soil-release agents, optical brighteners, abrasives, bactericides, tarnish inhibitors, coloring agents, and perfumes.

The liquid compositions according to the present invention can also be in "compact form", in such case, the liquid detergent compositions according to the present invention will contain a lower amount of water, compared to conventional liquid detergents.

Test Procedure

To assess the stabilizing effect of the added polymer-based latex, the stability of the suds controlling compositions incorporated in liquid detergent compositions are compared in the absence and presence of the polymer-based latex. More in particular, the stability of polydimethyl siloxane/fumed silica was determined in the absence and in the presence of polystyrene latex.(Lytron 631)

The stability of the samples were measured after several periods of storage at 21° C. The stability was determined by visual inspection of the samples:

Liquid detergent compositions according to the present invention, containing the finely dispersed form of the silicone antifoam agent have a translucent appearance.

Coalescence of the particles of the silicone antifoam agent causes flocculation of said particles, resulting in a change of visual appearance of the bulk solution from translucent to transparent.

The following examples are meant to exemplify compositions of the present inventions, but are not necessarily meant to limit the scope of the invention.

A liquid detergent composition according to the present invention is prepared, having the following compositions:

| | % by weight of the total detergent composition | |
|---|---|---|
| | I | II |
| Linear alkylbenzene sulfonate | 10 | 15 |
| Alkyl sulphate | 4 | |
| Fatty alcohol (C$_{12}$–C$_{15}$) ethoxylate | 9 | 14 |
| Fatty acid | 5 | 10 |
| Oleic acid | 4 | |
| Citric acid | 5 | 9 |
| KOH | | 3 |
| NaOH | 5.4 | |
| Monoethanolamine | | 9 |
| Propanediol | 1.5 | 9 |
| Ethanol | 5 | 1 |
| Minors | up to 100 | |

The above compositions I and II were each supplemented by the suds controlling compositions A and B (Table I). The components of the suds controlling composition were premixed before being added to the liquid detergent compositions. The stability of the samples IA, IB, IIA, IIB were determined after several weeks of storage at 21° C.

TABLE I

| | Percentage by weight of the total detergent composition | |
|---|---|---|
| Ingredients | A | B |
| Polydimethyl siloxane/fumed silica | 0.2 | 0.2 |
| Dispersant | 0.07 | 0.07 |
| Nonionic | 1.8 | 1.8 |
| Polystyrene latex | 0 | 0.08 |

TABLE I-continued

| Results | | |
|---|---|---|
| | IA | IB |
| Fresh | homogeneously dispersed translucent | homogeneously dispersed translucent |
| 1 wk | homogeneously dispersed translucent | homogeneously dispersed translucent |
| 3 wk | flocculation | homogeneously dispersed translucent |
| 6 wk | increased flocculation transparent | homogeneously dispersed translucent |
| | IIA | IIB |
| Fresh | homogeneously dispersed | homogeneously dispersed translucent |
| 1 wk | homogeneously dispersed | homogeneously dispersed translucent |
| 3 wk | flocculation | homogeneously dispersed translucent |
| 6 wk | increased flocculation transparent | homogeneously dispersed translucent |

In abscence of the polymer-based latex the finely dispersed silicone antifoam agent starts to agglomerate and flocculate upon storage, resulting in a transparent liquid.

In the presence of polymer-based latex, the finely dispersed silicone antifoam agent remains homogeneously dispersed in the liquid, resulting in a translucent liquid.

As can be seen from the results, the addition of low levels of polystyrene based latex greatly improves the stability of the finely dispersed silicone antifoam agent in the liquid detergent composition even upon long periods of storage.

I claim:

1. A liquid detergent composition comprising:

(A) a surfactant, builder, or mixtures thereof; and (B) a suds controlling composition comprising the following:
      (i) from 2% to 20% of a silicone antifoam agent comprising polydimethylsiloxane and silica;
      (ii) From 1% to 20% of a dispersing agent;
      (iii) from 1% to 40% of a polystyrene latex polymer; and
      (iv) from 30% to 95% of a carrier material and wherein the suds controlling composition comprises 0.8 to 3% of the total detergent composition.

2. The liquid detergent composition according to claim 1 wherein the dispersing agent is a mixture of cyclomethicone and a silicone glycol copolymer.

3. The liquid detergent composition according to claim 1 wherein the polystyrene latex polymer is present from 0.01% to 0.12% by weight of the total detergent composition.

* * * * *